United States Patent [19]

Hamasaki

[11] Patent Number: 5,410,348
[45] Date of Patent: Apr. 25, 1995

[54] AMPLIFIER TYPE IMAGE SENSOR WITH SHUTTER OPERATION

[75] Inventor: Masaharu Hamasaki, Kanagawa, Japan

[73] Assignee: Sony Corporation, Tokyo, Japan

[21] Appl. No.: 16,549

[22] Filed: Feb. 11, 1993

[30] Foreign Application Priority Data

Feb. 14, 1992 [JP] Japan .................................. 4-061357

[51] Int. Cl.$^6$ .............................................. H04N 3/14
[52] U.S. Cl. ...................................... 348/296; 348/304
[58] Field of Search ...................... 358/213.19, 213.13, 358/213.12, 213.27; 257/229; H04N 3/14; 348/294, 296, 302, 303, 304

[56] References Cited

U.S. PATENT DOCUMENTS 4,531,156  7/1985  Nishizawa et al. ............ 358/213.12
4,603,355  7/1986  Yamada et al. ................. 358/213.13
5,288,988  2/1994  Hashimoto et al. ............ 348/302 X

*Primary Examiner*—Michael T. Razavi
*Assistant Examiner*—Wendy R. Greening
*Attorney, Agent, or Firm*—Hill, Steadman & Simpson

[57] ABSTRACT

The present invention is directed to a solid state image sensor in which one horizontal line from an image sensor section is selected as a line in which a signal is read out from a pixel, a signal is read out to a vertical signal line by a vertical scanning in which selected horizontal lines are sequentially switched, and pixel the signal of the horizontal line, processed in a correlation double sampling fashion, is read out to a horizontal signal line in a constant order. This solid state image sensor has an electronic shutter function includes an electronic shutter scanning means for resetting a horizontal line spaced apart from a horizontal line currently read out by a shutter time in the vertical scanning direction.

5 Claims, 3 Drawing Sheets

F I G. 2A
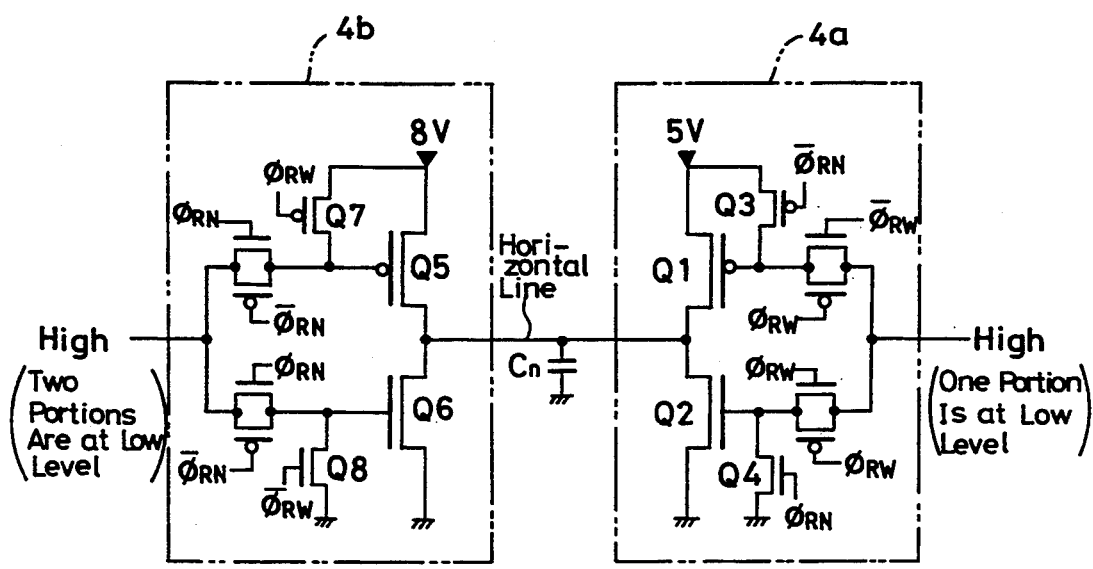
F I G. 2B
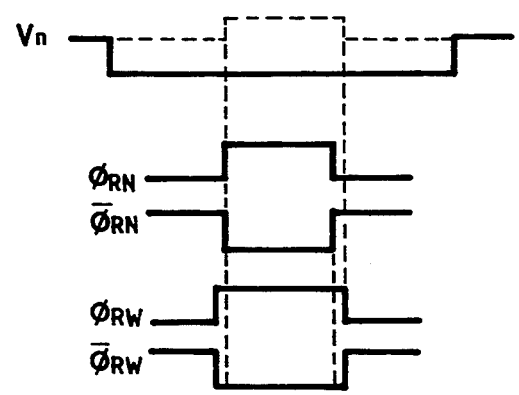

AMPLIFIER TYPE IMAGE SENSOR WITH SHUTTER OPERATION

BACKGROUND OF THE INVENTION

1. Field of the Invention

The present invention relates to solid state image sensors and, more particularly, to a solid state image sensor which includes at least an image sensor section having an array of a plurality of pixels arranged in the horizontal and vertical directions in a two-dimensional matrix fashion, a vertical scanning means for selecting one horizontal line of the image sensor section as a line for reading out a signal from a pixel and a horizontal scanning means for reading out signals of pixels of the thus read-out horizontal line in a constant order.

2. Description of the Prior Art

As conventional solid state image sensors, there is known such a solid state image sensor which at least includes an image sensor section having an array of a plurality of pixels arranged in the horizontal and vertical directions in a two-dimensional matrix fashion, a vertical scanning circuit for selecting one horizontal line of the image sensor section as a line for reading out a signal from a pixel and a horizontal scanning circuit for reading out signals of pixels of the thus read-out horizontal line in a constant order. Signals of respective pixels of the horizontal line selected by the vertical scanning circuit are read out to the respective vertical signal lines, and are suppressed with respect to noise by a correlation double sampling circuit. Then, the signal of one horizontal line is read out to the horizontal signal line in a constant order by the horizontal scanning circuit.

Such a conventional solid state image sensor reads out the signal in a manner entirely different from that of a CCD (charge coupled device) type solid state image sensor in which signal charges read-out from pixels are transferred in the vertical and horizontal directions by the shift register.

The conventional CCD type solid state image sensors include an electronic shutter function. A principle of electronic shutter is to substantially redlace an electric charge storage time by discharging signal electric charges during one portion of the electric charge storage period.

It is desirable that the solid stage image sensor in which signals of respective pixels of the horizontal line selected by the vertical scanning circuit are read out to respective vertical signal lines and signals of respective vertical signal lines are read out to the horizontal signal line by the horizontal scanning circuit in the constant order be provided with the electronic shutter function. However, the principle of electronic shutter of the CCD type solid state image sensor cannot be applied to the solid state image sensor of the aforesaid type as it presently exists.

OBJECTS AND SUMMARY OF THE INVENTION

Therefore, it is an object of the present invention to provide an improved solid state image sensor in which the aforesaid shortcomings and disadvantages encountered with the prior art can be eliminated.

It is another object of the present invention to provide a solid state image sensor having an electronic shutter function in which signals of respective pixels of a horizontal line selected by a vertical scanning means are read out to respective vertical signal lines and signals of respective vertical signal lines are read out to horizontal signal lines by a horizontal scanning circuit in constant order.

According to a first aspect of the present invention, there is provided a solid state image sensor which includes an electronic shutter scanning means which selects a horizontal line spaced apart from the horizontal line currently selected by the vertical scanning means by the number of horizontal lines corresponding to the shutter time in the vertical direction as a line in which the signal of a pixel is read out and which sequentially switches the horizontal line selected at the same speed as the switching speed of the vertical scanning means.

According to a second aspect of the present invention, there is provided a solid state image sensor in which a tri-state driver (three-value driver) is provided among the vertical scanning means, the electronic shutter scanning means and each horizontal line to output signals of first, second and third levels.

According to a third aspect of the present invention, there is provided a solid state image sensor in which an electronic shutter scanning means outputs the signal which selects the horizontal line reset for electronic shutter and the signal which selects the horizontal line currently selected by the vertical scanning means to the tri-state driver.

According to the solid state image sensor of the first aspect of the present invention, since the horizontal line read out after the currently read-out horizontal line by a certain time can be reset by the electronic shutter scanning means, signals accumulated in the pixels until the horizontal line is selected and read out by the vertical scanning circuit after the horizontal line was reset can be read out. Then, the horizontal line thus reset is switched at the same speed as the switching speed of the horizontal line thus read out. Therefore, this solid state image sensor can obtain the electronic shutter function. The shutter period is determined on the basis of the number of horizontal lines existing between the horizontal line read out by the electronic shutter means and the horizontal line read out by the electronic shutter scanning means.

According to the solid state image sensor of the second aspect of the present invention, when the horizontal line is not selected a first level such as 0 V, when the horizontal line is selected to be read out second level such as 5 V, and when the horizontal line is selected to be reset the third level such as 8 V can be supplied to the horizontal line by the tri-state driver. Thus, the nonselection, the selection and the reset operation which are indispensable to the electronic shutter can be carried out without trouble.

That is, when the pixel signal is reset, a signal having an amplitude larger than that required when the signal is read out is frequently required. In that case, even when the outputs of the electronic shutter scanning means and the vertical scanning means are directly applied to the horizontal line, the normal operation cannot be expected because only two kinds of levels can be output. However, if the tri-state driver is employed, then three kinds of levels can be output so that the normal operation becomes possible.

According to the solid state image sensor of the third aspect of the present invention, the electronic shutter scanning means outputs not only the signal which selects the horizontal line to be reset but also the signal which selects the horizontal line read out by the vertical scanning means. There is then no risk that the reset operation for processing the signal of the horizontal line selected by the vertical scanning means in a correlation double sampling fashion will be hindered by the electronic shutter scanning means.

That is, an operation in which a signal from a pixel is read out and clamped to a predetermined clamping potential, an operation in which a pixel signal is reset to make the pixel signal empty (vacant) and a signal read-out operation for reading out the empty signal (noise component) to detect the changed amount of the clamped potential are indispensable to the correlation double sampling. Therefore, without the reset operation, the read-out operation of the signal cannot be effected.

If the electronic shutter scanning means is operated only to designate the horizontal line that is reset for the electronic shutter, then other horizontal lines are set to the first level, e.g., 0 V by the electronic shutter scanning means so that the reset operation by the vertical scanning means becomes impossible.

However, according to the solid state image sensor of the third aspect of the present invention, the electronic shutter scanning means outputs not only the signal which selects the horizontal line to be reset but also the signal which selects the horizontal line read out by the vertical scanning means. It is possible to avoid the reset operation necessary for reading out the signal of the horizontal line selected by the vertical scanning means from being hindered by the electronic shutter scanning means.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 2A is a diagram showing a circuit arrangement of an example of a tri-state driver (three-value driver);

FIG. 2B is a timing chart used to explain operation of the example of the tri-state driver.

DETAILED DESCRIPTION OF THE PREFERRED EMBODIMENT

A solid state image sensor according to an embodiment of the present invention will hereinafter be described with reference to the drawings.

Figure 1A:
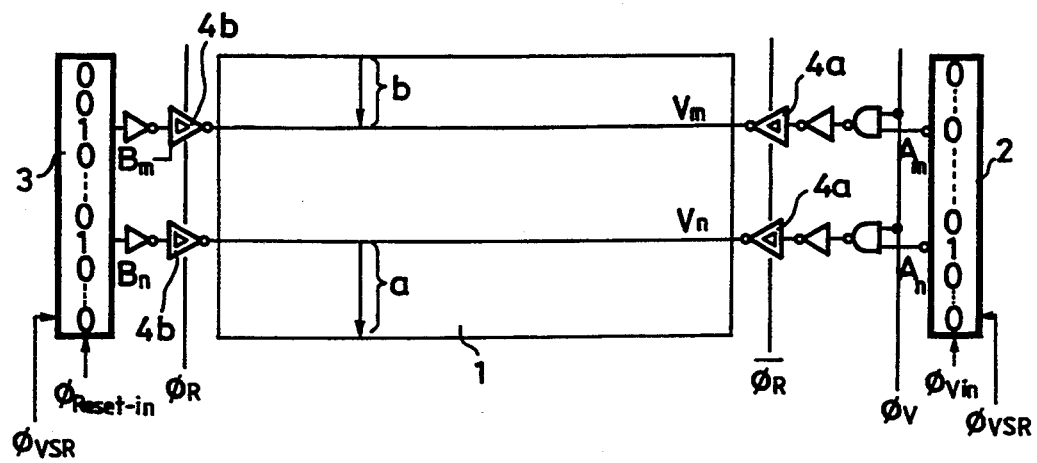
FIG. 1A is a schematic diagram showing a circuit arrangement of a solid state image sensor according to an embodiment of the present invention.
Figure 1B:
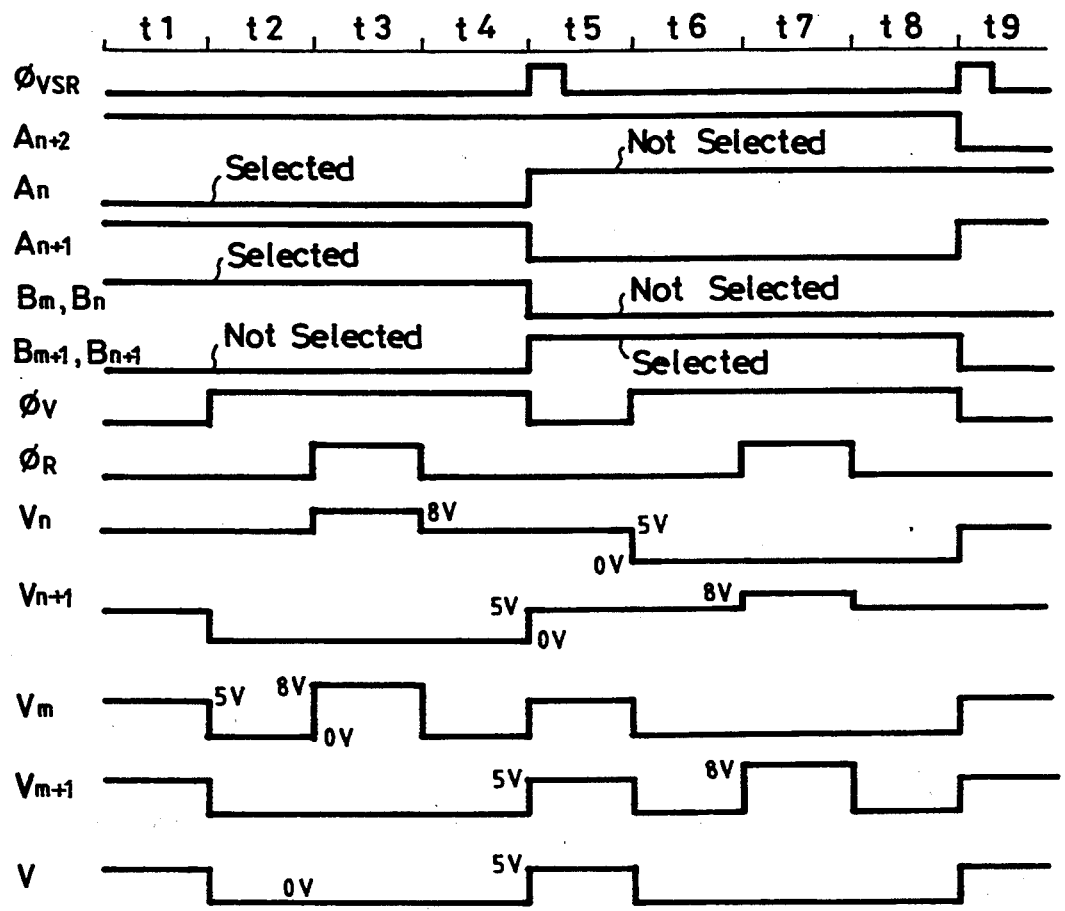
FIG. 1B is a timing chart showing operation of the solid state image sensor during a horizontal blanking period.

FIGS. 1A and 1B show the solid state image sensor according to an embodiment of the present invention. FIG. 1A is a schematic diagram showing a circuit arrangement of the solid state image sensor according to the present invention. FIG. 1B is a timing chart used to explain operation thereof.

As shown in FIG. 1A, an image sensor section 1 has an array of a plurality of pixels arranged in the horizontal and vertical direction in a two-dimensional matrix fashion. A vertical scanning circuit 2 selects one horizontal line from the image sensor section 1 as a line in which a signal is read out from a pixel and sequentially switches selected horizontal lines. The vertical scanning circuit 2 is formed of a shift register and is provided on the right-hand side of the image sensor section 1 as shown in FIG. 1.

Signals A1, A2, . . . , of respective bits of the vertical scanning circuit 2 formed of the shift register are respectively applied through NAND circuits, inverters and tristate drivers 4 to respective horizontal lines of the image sensor section 1. In the vertical scanning circuit 2, of a number of bits, only a bit of a read-out horizontal line (e.g., n'th horizontal line) currently selected goes to "1" and other bits are all "0". Then, the bit that goes to "1" is shifted at every 1H (H is a horizontal period) period. A reference symbol $\phi_{VSR}$ depicts a shift clock pulse. A reference symbol $\phi_V$ depicts a signal applied to the respective NAND circuits at their input terminals different from those to which signals from the vertical scanning circuit 2 are applied. By this signal $\phi_V$, horizontal line bits that are not selected are all set to "low level".

An electronic shutter scanning means 3 selects a horizontal line spaced apart from the horizontal line currently selected by the vertical scanning circuit 2 by the number of lines corresponding to a shutter time in the vertical scanning direction and sequentially switches horizontal lines to be selected at the same speed as the switching speed of the vertical scanning circuit 2. The electronic shutter scanning means 3 is formed of a shift register and is provided at the left-hand side of the image sensor section 1 in FIG. 1.

Signals B1, B2, . . . of respective bits of the electronic shutter scanning circuit 3 formed of the shift register 1 are respectively applied through inverters and tri-state drivers 4 to the respective horizontal lines of the image sensor section 1.

In the electronic shutter scanning circuit 3, of a number of bits, a horizontal line bit (e.g., m'th horizontal line) currently selected for the reset operation of the electronic shutter and a horizontal line bit (n'th horizontal line) selected for the read-out operation by the vertical scanning circuit 2 go to "1" and other bits go to "0".

The reason that the horizontal line bit (n'th horizontal line) selected for the read-out operation by the vertical scanning circuit 2 is set to "1" is to avoid the electronic shutter scanning circuit 3 from hindering the read operation for processing the signal of the horizontal line selected by the vertical scanning circuit 2 in a correlation double sampling fashion.

Two bits that go to "1" in this electronic shutter scanning circuit 3 are shifted at every 1H at the same shifting speed in the vertical direction in synchronism with the vertical scanning circuit 2. The shift clock pulse $\phi_{VSR}$ input to the vertical scanning circuit 2 is also input to the electronic shutter scanning circuit 3.

FIGS. 2A and 2B are diagrams used to explain an example of a circuit arrangement of the tri-state driver (three-value driver) 4. FIG. 2A is a circuit diagram and FIG. 2B is a timing chart thereof. As shown in FIG. 2A, each of the tri-state drivers 4 comprises a portion 4a to which a power source voltage of 5 V (second level) is applied and a portion 4b to which a power source voltage of 8 V (third level) is applied. Outputs of the respective portions 4a, 4b are connected to the horizontal lines corresponding to the tri-state drivers 4.

The portion 4a provided between the vertical scanning circuit 2 and the horizontal line will be described first. As shown in FIG. 2A, a main body of the portion 4a is a CMOS (complementary metal oxide semiconductor) which comprises a p-channel MOS (metal oxide semiconductor) transistor Q1 and an n-channel MOS transistor Q2. The portion 4a receives the power source voltage of 5 V and an output thereof is connected to the horizontal line. Between the power source terminal of 5 V and the gate of the p-channel MOS transistor Q1, there is connected a p-channel MOS transistor Q3 which is controlled by a signal which results from inverting the reset narrow signal $\phi_{RN}$.

Between the gate of the n-channel MOS transistor Q2 and the ground, there is connected an n-channel MOS transistor Q4 which is controlled by the reset narrow signal $\phi_{RN}$.

To the respective gates of the MOS transistors Q1, Q2 of the CMOS inverter, there is applied an input signal through a CMOS transfer gate that is controlled by a reset wide signal $\phi_{RW}$ and an inverted signal thereof.

To be more concrete, the input signal is a signal which results from supplying a signal A from the vertical scanning circuit 2 through the NAND circuits and the inverters. The above input signal goes to "high level" when the horizontal line is not selected and goes to "low level" when the horizontal line is selected. Of a number of input signals (more than 1000 input signals), only one input signal goes to "low level" and other remaining signals all go to "high level".

The portion 4b provided between the electronic shutter scanning circuit 3 and the horizontal line will be described next. As shown in FIG. 2A, a main body of the portion 4b is a CMOS inverter which comprises MOS transistors Q5 and Q6. The portion 4b receives the power source voltage of 8 V (third level) and an output thereof is connected to the horizontal line.

Between the power source terminal of 8 V and the gate of the p-channel MOS transistor Q3 there is connected a p-channel MOS transistor Q7 which is controlled by the reset wide signal $\phi_{RW}$. Between the gate of the n-channel MOS transistor Q4 and the ground, there is connected an n-channel MOS transistor Q8 which is controlled by an inverted signal of the reset wide signal $\phi_{RW}$.

To the respective gates of the MOS transistors Q3, Q4 of the CMOS inverter there is applied an input signal through the CMOS transfer gate which is controlled by the reset narrow signal $\phi_{RN}$ and an inverted signal of the reset narrow signal $\phi_{RN}$.

To be more concrete, the input signal is a signal which results from supplying a signal B from the electronic shutter scanning circuit 3 through the inverter. This input signal goes to "high level" when the horizontal line is not selected and goes to "low level" when the horizontal line is selected. Accordingly, of a number of input signals, only two input signals go to "low level" constantly and other remaining input signals go to "high level".

The reset narrow signal $\phi_{RN}$, its inverted signal and the reset wide signal $\phi_{RW}$ and, its inverted signal are formed on the basis of one reset signal $\phi_R$ (and its inverted signal). The reason that the reset narrow signal $\phi_{RN}$ and the reset wide signal $\phi_{RW}$ are formed is to prevent a penetrating current from flowing through the transistors Q3, Q4, Q7 and Q8 when the "high level" or "low level" gates of the MOS transistors Q1, Q2, Q5, Q6 are cut off.

The reason for this will be described below in association with the transistors Q6, Q8. When the "high level" gate of the MOS transistor Q6 is changed to "low level" gate by the MOS transistor Q8, if the CMOS transfer gate is temporarily set in its ON-state, then a penetrating current flows through the CMOS transfer gate and the MOS transistor Q8. When such penetrating current is flowed to 1000 tri-state drivers or more at the same time, a consumed current becomes too large to be neglected.

Therefore, the MOS transistor Q8 is controlled by the inverted signal of the reset wide signal $\phi_{RW}$ and the CMOS transfer gate is controlled by the inverted signal of the reset narrow signal $\phi_{RN}$ so that the CMOS transfer gate is turned off without fail while the MOS transistor Q8 is in its ON-state.

The tri-state driver 4 (4a, 4b) fundamentally energizes the portion 4a when the reset signal $\phi_R$ is at "low level" (when the inverted signal of the reset signal $\phi_R$ is at "high level") and disables the portion 4b (output is set in the floating state). More specifically, when the input signal to the portion 4a of the tri-state driver 4 is at "low level", the horizontal line goes to 5 V. When it is at "high level", the horizontal line goes to 0 V.

Conversely, when the reset signal $\phi_R$ goes to "high level" (when the inverted signal of the reset signal $\phi_R$ goes to "low level"), the portion 4a is disabled (output is set in the floating state), and the portion 4b is energized. To be more concrete, when the input signal to the portion 4b is at "low level" (when the horizontal line is selected), the horizontal line goes to 8 V. When it is at "high level" (when the horizontal line is not selected), the horizontal line goes to 0 V.

Figure 3:
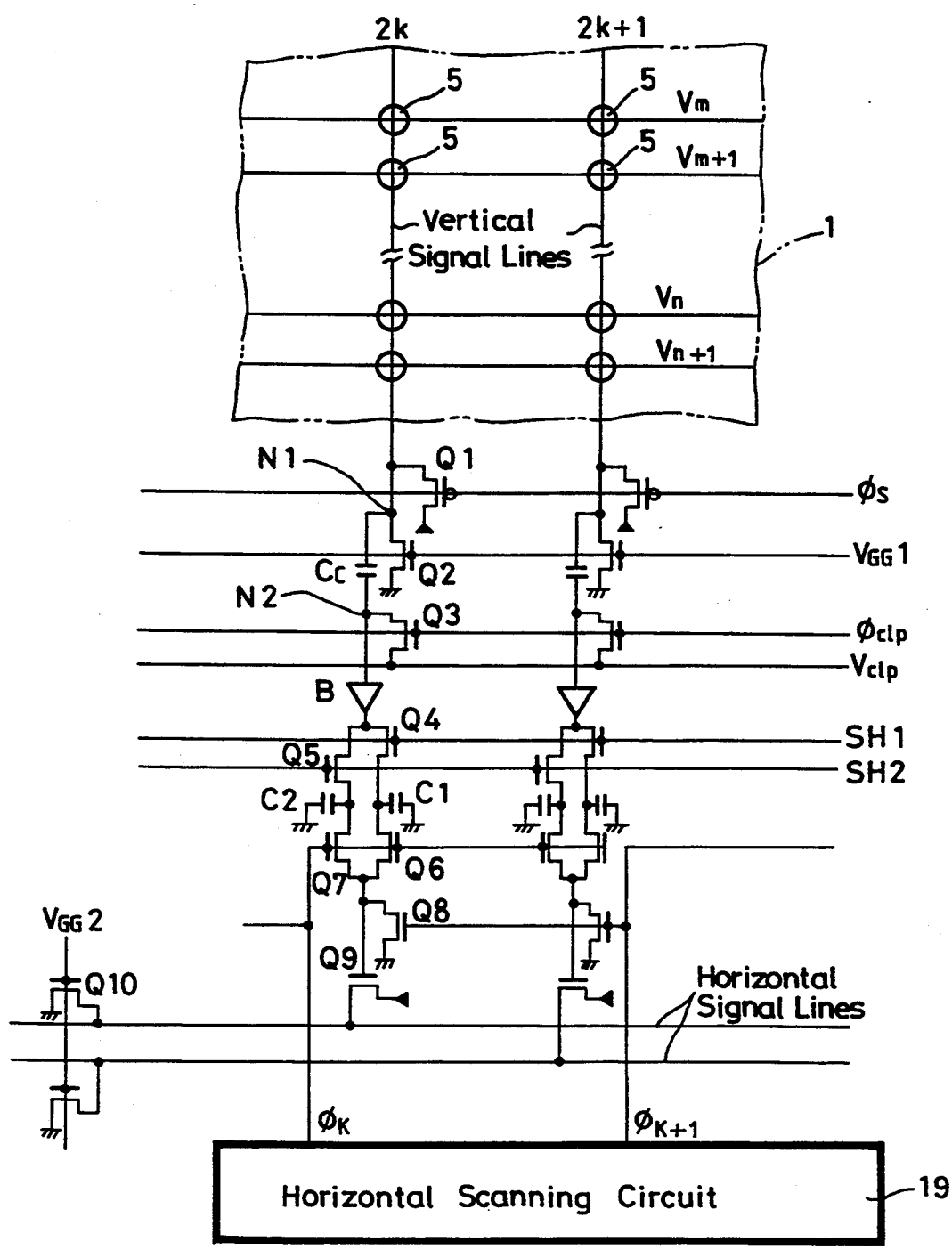
FIG. 3 is a diagram showing an output circuit section of the solid state image sensor in which a signal read-out to a vertical signal line is processed in a correlation double sampling fashion and then output to the horizontal signal line.
Figure 3:
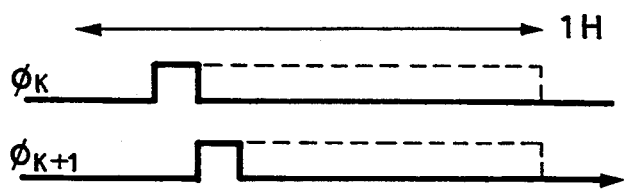

FIG. 3 shows an output circuit section which reads out a signal read-out to the vertical signal line by a correlation double sampling process. In FIG. 3, transistors Q1, Q2 (transistors Q1 to Q8 in FIG. 3 have no connection with the transistors Q1 to Q8 of FIG. 2) are MOS transistors connected in series which bias a node N1 (output point of the vertical signal line) in response to a signal $\phi_S$. When the signal $\phi_S$ has not arrived, the transistors Q1, Q2 do not restrain the node N1. The transistor Q1 is a p-channel MOS transistor which receives the signal $\phi_S$ and the transistor Q2 is an n-channel MOS transistor which biases the node N1 (output point of the vertical signal line). Reference symbol $V_{GG1}$ depicts a bias voltage. In response to the signal $\phi_S$, the transistors Q1, Q2 allow the signal to be transmitted to a buffer B through a noise eliminating capacitor Cc. One end of the capacitor Cc is connected to a junction between the transistors Q1 and Q2 and the other end thereof is connected to the input of the buffer B. Reference symbol N2 depicts a node provided on the input terminal side of the buffer B.

Reference symbol Q3 depicts a clamping transistor which clamps the node N2 to a predetermined clamping voltage Vclp when receiving a clamping command signal $\phi clp$. Reference symbols Q4, Q5 depict MOS transistors which are controlled by sample and hold signals SH1, SH2 so as to transmit a signal from the buffer B to sample and hold capacitors C1, C2.

To be more concrete, the MOS transistor Q4 receives the sample and hold signal SH1 and transmits the output signal of the buffer B to the capacitor C1. The MOS transistor Q5 receives the sample and hold signal SH2 and transmits the output signal of the buffer B to the capacitor C2.

Reference symbols Q6, Q7 depict MOS transistors which read out signals from the capacitors C1, C2 in response to a horizontal scanning signal $\phi_K$ from a horizontal scanning circuit 19. Reference symbol Q8 depicts an MOS transistor which resets the capacitors C1, C2 and reference symbol Q9 depicts a source-follower transistor interposed between the MOS transistors Q6, Q7 and the horizontal signal line. Reference symbol Q10 designates an MOS transistor connected to the horizontal signal line. On the lower portion of the horizontal scanning circuit 19, there are shown timing charts of horizontal scanning signals $\phi_K$, $\phi_{K+1}$.

In the blanking period, signals of respective horizontal line pixels selected by the vertical scanning circuit 2 during a period (t2), i.e., line n are read out to the vertical signal lines at the same time and that signal is clamped by the clamping command signal $\phi$clp during a period (t3). In the next period (t4), empty signals are read out at the same time and accumulated in the capacitor C1.

In the next period (t5), the selected line is switched from the horizontal line n to a horizontal line n+1. Thereafter (periods t6 to t8), signals are read out and accumulated in the capacitor C2 by the correlation double sampling similarly to the horizontal line n. Signals thus written in the capacitors C1, C2 are read out to the horizontal scanning signal line by the horizontal scanning circuit 19 during the horizontal scanning period. In the case of the field read-out processing, the signals accumulated in the capacitors C1, C2 are read out in the mixed state.

The electronic shutter function of the solid state image sensor will be described with reference to the circuit diagram of the solid state image sensor shown in FIG. 1A and the timing chart of horizontal blanking period shown in FIG. 1B.

Fundamentally, in the solid state image sensor of the present invention, during the periods of t2 to t4, the n'th horizontal line is read out by the vertical scanning circuit 2 and the m'th horizontal line is reset by the electronic shutter scanning circuit 3. Then, during the periods of t6 to t8, (n+1)'th horizontal line is read out and (m+1)'th horizontal line is reset by the electronic shutter scanning circuit 3.

More specifically, during the period t2, the signal $\phi_V$ applied to one input terminal of NAND circuits provided at every bit of the vertical scanning circuit 2 goes to "high level". As a result, although only the voltage Vn of the selected horizontal line n is kept at "high level", voltages of other horizontal lines are all changed from "high level" to "low level". The signal A of each bit of the vertical scanning circuit 2 is at negative logic. A signal An is at "low level" and other signals A are at "high level". At that time, in a signal (positive logic) of the electronic shutter scanning circuit 3, only bits (Bm, Bn) of reset horizontal line and read-out horizontal line are at "high level" and other bits are at "low level".

During the period t2, the signal of the n'th horizontal line is read out as earlier noted, which is what might be called a first operation for the correlation double sampling.

During the next period t3, the reset pulse $\phi_R$ goes to "high level". Then, the tri-state driver 4 is completely disabled at its portion 4a on the vertical scanning circuit 2 side and the portion 4b on the electronic shutter scanning circuit 3 side is energized. As a result, the voltages Vn and Vm of the two horizontal lines n and m selected by the electronic shutter scanning circuit 3 are increased to 8 V and the reset operation is carried out in the two horizontal lines. The reset operation in the horizontal line n is effected for the correlation double sampling and the reset operation in the horizontal line m is effected for the electronic shutter. That is, the reset operation for the correlation double sampling and the reset operation for the electronic shutter are carried out at the same timing.

During the period t4, the reset signal $\phi_R$ goes to "low level" so that the tri-state driver 4 is disabled at its portion 4b on the electronic shutter scanning circuit 3 side and is energized at its portion 4a on the vertical scanning circuit 2 side, thereby reading out the empty state of the horizontal line n.

During the next period t5, signals from the vertical scanning circuit 2 and the electronic shutter scanning circuit 3, each of which is formed of the shift register, are shifted by one bit in the vertical direction. During the periods t6 to t8, the signal of the horizontal line n+1 is read out and the signal of the horizontal line m+1 is reset by the correlation double sampling.

According to the aforesaid solid state image sensor, since the horizontal lines (m, m+1) read out after the currently read out horizontal lines (n, n+1) by a certain time are reset by the electronic shutter scanning circuit 3, signals accumulated in the pixels until the signals are read out after the reset operation can be read out. The shutter time is determined on the basis of the number of horizontal lines existing between the horizontal line read out by the electronic shutter scanning circuit 3 and the horizontal line read out by the electronic shutter scanning circuit 3 and can be varied. That is, the number of lines existing between the portions a and b in FIG. 1 is proportional to the shutter time. The less the number of lines becomes, the shorter the shutter time becomes.

Since the tri-state driver 4 is provided among the vertical scanning circuit 2, the electronic shutter scanning circuit 3 and each horizontal line, the level of 0 V is output when the horizontal line is not selected, the level of 5 V is output when the selected horizontal line is simply read out, and the level of 8 V is output when the reset operation is carried out, whereby the correlation double sampling and the reset operation for the electronic shutter can be carried out without trouble. It is needless to say that, if three values are output properly, the circuit shown in FIG. 2 is not always required.

The electronic shutter scanning circuit 3 outputs not only the signal which selects the horizontal line to be reset but also the signal which selects the horizontal line read out by the vertical scanning circuit 2. There is then no risk that the reset operation for the correlation double sampling of the signal of the horizontal line selected by the vertical scanning circuit 2 will be hindered by the electronic shutter scanning circuit 3.

The drivers provided in the left and right sides of the image sensor section are not limited to the above-mentioned tri-state drivers and the following variant is also possible. That is, ordinary drivers are used and switching means are respectively provided between the driver on the vertical scanning circuit side and the horizontal line and between the driver on the electronic shutter scanning circuit side and the horizontal line. Then, by switching the two switching means, a selection signal from the vertical scanning circuit side may be input to the horizontal line or a selection signal from the electronic shutter scanning circuit side may be input to the horizontal line.

Such solid state image sensor, however, is not preferable because its resistance interposed in the path through which the selected signal is applied to the horizontal line is increased and it cannot be operated at high speed substantially.

Further, such a variant is also possible. That is, both the vertical scanning circuit and the electronic scanning circuit are provided on one side of the image sensor section and the selection signals from the vertical scanning circuit and the electronic shutter scanning circuit are switched by means of a logic gate, thereby being input to the horizontal line of the image sensor section. According to this proposal, the driver need not be provided on both sides of the image sensor section and may be provided on one side, thereby reducing the number of drivers. Also, there is then the advantage such that an impedance in the path through which the selection signal is applied to the horizontal line can be lowered. In this case, however, the reset voltage cannot be increased, i.e., the solid state image sensor cannot be driven at the tri-state level substantially.

According to the illustrated embodiment of the solid state image sensor, the solid state image sensor can be given an electronic shutter function relatively easily.

According to present invention, the solid state image sensor includes the electronic shutter scanning means which selects a horizontal line spaced apart from the horizontal line currently selected by the vertical scanning means by the number of horizontal lines corresponding to the shutter time in the vertical direction as the line in which the signal of pixel is read out and which sequentially switches the horizontal line selected at the same speed as the switching speed by the vertical scanning means.

Therefore, according to the solid state image sensor of the present invention, since the horizontal line read out after the currently read-out horizontal line by a certain time can be reset by the electronic shutter scanning means, signals accumulated in the pixels until the signals are read out to the vertical scanning circuit after the reset operation can be read out and the electronic shutter function can be presented.

Further, according to the present invention, there is provided the solid state image sensor in which the tri-state driver is provided among the vertical scanning means, the electronic shutter scanning means and each horizontal line to output signals of first, second and third, three levels.

Therefore, according to the solid state image sensor of the present invention, when the horizontal line is not selected the first level such as 0 V, when the horizontal line is selected for reading the second level such as 5 V, and when the horizontal line is selected for reset operation the third level such as 8 V can be supplied to the horizontal line by the tri-state driver. Thus, the non-selection, the selection and the reset operation which are indispensable for the electronic shutter can be carried out without trouble.

Furthermore, according to the present invention, there is provided the solid state image sensor in which the electronic shutter scanning means outputs the signal which selects the horizontal line reset for electronic shutter and the signal which selects the horizontal line currently selected by the vertical scanning means to the tri-state driver.

Therefore, according to the solid state image sensor of the present invention, the electronic shutter scanning means outputs not only the signal which selects the horizontal line to be reset but also the signal which selects the horizontal line read out by the vertical scanning means. There is then no risk that the reset operation for processing the signal of the horizontal line selected by the vertical scanning means in a correlation double sampling fashion will be hindered by the electronic shutter scanning means.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A solid state image sensor, comprising:
    an image sensor section having an array of a plurality of pixels arranged in horizontal and vertical directions in a two-dimensional matrix fashion, rows of pixels in the horizontal direction forming horizontal lines, and columns of pixels in the vertical direction being connected to vertical signal lines;
    vertical scanning means for selecting one horizontal line of said image sensor section as a line from which corresponding signals from correspondingly sequentially selected pixels along the line are to be read out;
    horizontal scanning means for reading out the signals of the sequentially selected pixels along the selected horizontal line via said vertical signal lines;
    an electronic shutter scanning means for selecting another horizontal line,, at the same time that the vertical scanning means selects said one horizontal line,, for resetting signals of pixels in said another horizontal line, said another horizontal line being spaced apart from said one horizontal line by a predetermined number of horizontal lines corresponding to a desired shutter time for reducing an electric charge storage time by discharging signal electronic charges during one portion of an electric charge storage period; and
    said electronic shutter scanning means in addition to selecting said another horizontal line simultaneously selecting said one horizontal line also selected by said vertical scanning means so that signals output on said one horizontal line selected by the vertical scanning means is not hindered by the electronic shutter scanning means.

2. A solid state image sensor according to claim 1 wherein sequential selection of said one horizontal lines by said vertical scanning means occurs at a same speed as sequential selection of said another horizontal lines by said electronic shutter scanning means.

3. A solid state image sensor according to claim 1 wherein said horizontal scanning means reads out sequential pixels on said one horizontal line selected by the vertical scanning means by a correlation double sampling circuit for suppressing noise and are then read out to a horizontal signal line in sequential fashion by said horizontal scanning means.

4. A solid state image sensor, comprising:
    an image sensor section having an array of a plurality of pixels arranged in horizontal and vertical directions in a two-dimensional matrix fashion, rows of pixels in the horizontal direction forming horizontal lines;

a vertical scanning circuit for selecting one horizontal line of said image sensor section as a line from which corresponding signals from correspondingly sequentially selected pixels along the line are to be read out;

a horizontal scanning circuit for reading out the signals of the sequentially selected pixels along the selected horizontal line;

an electronic shutter scanning circuit for selecting another horizontal line,, at the same time that the vertical scanning circuit selects said one horizontal line,, for resetting signals of pixels in said another horizontal line, said another horizontal line being spaced apart from said one horizontal line by a predetermined number of horizontal lines corresponding to a desired shutter time for reducing an electric charge storage time by discharging signal electric charges during one portion of an electric charge storage period; said electronic shutter scanning circuit in addition to selecting said another horizontal line simultaneously selecting said one horizontal line also selected by said vertical scanning circuit so that signals output on said one horizontal line selected by the vertical scanning circuit is not hindered by the electronic shutter scanning circuit.

5. A solid state image sensor, comprising:

an image sensor section having an array of a plurality of pixels arranged in horizontal lines and vertical columns connected to vertical signal lines in a two-dimensional matrix fashion;

vertical scanning means for selecting one horizontal line from said image sensor section from which signals corresponding to pixels sequentially selected there along are to be read out;

an output circuit at every vertical signal line for reading a signal from a pixel in a correlation double sampling fashion and temporarily storing the same;

horizontal scanning means for sequentially reading out signals of pixels of one horizontal line stored in said output circuit;

electronic shutter scanning means for selecting another horizontal line spaced apart from said one horizontal line currently selected by said vertical scanning means, said spacing apart being defined by a number of horizontal lines corresponding to a shutter time, said electronic shutter scanning means resetting pixel signals in said another horizontal line, and said electronic shutter scanning means sequentially selecting said another horizontal line at a same speed as said vertical scanning means sequentially selects said one horizontal line;

a set of tri-state drivers connecting the horizontal lines to the vertical scanning means and another set of tri-state drivers connecting the horizontal lines to the electronic shutter scanning means, said tri-state drivers outputting signals of first, second, and third levels, said tri-state driver outputting said first level when a horizontal line is not selected, said second level when a horizontal line is selected and pixel signals are being read out therefrom, and said third level when pixel signals are reset; and said electronic shutter scanning means also simultaneously selecting said one horizontal line simultaneously selected by said vertical scanning means at the same time it is selecting said another horizontal line.

* * * * *